US006157868A

United States Patent [19]

Abe

[11] Patent Number: 6,157,868

[45] Date of Patent: Dec. 5, 2000

[54] METHOD OF CORRECTING CUTTING PATTERN, CUTTING PATTERN CORRECTION SYSTEM, AND STORAGE MEDIUM FOR CUTTING PATTERN CORRECTION

[75] Inventor: Hideaki Abe, Miyagi, Japan

[73] Assignees: Japan Vilene Company Ltd., Tokyo; Vitec Company, Ltd., Miyagi, both of Japan

[21] Appl. No.: 09/041,626

[22] Filed: Mar. 13, 1998

[30] Foreign Application Priority Data

Mar. 17, 1997 [JP] Japan .................................... 9-063550

[51] Int. Cl.[7] ...................................................... G06F 19/00

[52] U.S. Cl. ............................................ 700/134; 700/131

[58] Field of Search .................................... 700/130, 131, 700/132, 133, 134, 135, 136, 167

[56] References Cited

U.S. PATENT DOCUMENTS

| | | | |
|---|---|---|---|
| 4,677,564 | 6/1987 | Paly et al. | 700/95 |
| 5,376,144 | 12/1994 | McClain et al. | 8/116.4 |
| 5,544,599 | 8/1996 | Frazer et al. | 112/118 |
| 5,733,635 | 3/1998 | Terakawa et al. | 428/198 |
| 5,975,743 | 11/1999 | Bercaits | 700/134 |

FOREIGN PATENT DOCUMENTS

| | | |
|---|---|---|
| 0239665 | 10/1987 | European Pat. Off. . |
| 0387371 | 9/1990 | European Pat. Off. . |
| 63-120166 | 5/1988 | Japan . |
| 446797 | 2/1992 | Japan . |
| 6219617 | 8/1994 | Japan . |
| WO9529046 | 11/1995 | WIPO . |

OTHER PUBLICATIONS

Tokio Kawabata, "Standardization and Analysis of Feeling" (the second edition), Published on Jul. 10, 1980.

*Primary Examiner*—Thomas C. Lee
*Assistant Examiner*—Nitin Patel
*Attorney, Agent, or Firm*—Leydig, Voit & Mayer, Ltd.

[57] ABSTRACT

In a method of correcting a cutting pattern according to a characteristic of a fabric, a shrinkage ratio of the sponged fabric is measured, and the cutting pattern is corrected according to thus obtained shrinkage ratio data. Since the fabric is sponged, the amount of moisture contained in the fabric is controlled, and the tension applied to the fabric is relaxed, whereby the fabric is restrained from changing its size in the subsequent steps. Also, when shrinkage ratio data taking account of the subsequent fabric processing steps are used for the correction, the cutting pattern can be corrected more accurately.

13 Claims, 6 Drawing Sheets

Fig.4A

TABLE 1

| UNIT WEIGHT ($g/m^2$) | MODIFICATION VALUE |
|---|---|
| 0~100 | 0.1 |
| 101~200 | 0.2 |
| 201 OR ABOVE | 0.4 |

Fig.4B

TABLE 2

| KES TENSILE CHARACTERISTIC | MODIFICATION VALUE |
|---|---|
| 0.0~6.0 | 0.3 |
| 6.1~12.0 | 0.8 |
| 12.1~16.0 | 1.2 |
| 16.1~20.0 | 1.5 |
| 20.1 OR ABOVE | 2.0 |

Fig.4C

TABLE 3

| UNIT WEIGHT ($g/m^2$) | MODIFICATION VALUE |
|---|---|
| 0~100 | 0.0 |
| 101~200 | 0.1 |
| 201 OR ABOVE | 0.2 |

METHOD OF CORRECTING CUTTING PATTERN, CUTTING PATTERN CORRECTION SYSTEM, AND STORAGE MEDIUM FOR CUTTING PATTERN CORRECTION

BACKGROUND OF THE INVENTION

1. Field of the Invention

The present invention relates to a cutting pattern correcting method for correcting a cutting pattern used for cutting a clothing fabric into a plurality of patterns, a cutting pattern correction system, and a storage medium for cutting pattern correction.

2. Related Background Art

Conventionally, clothes have been made in the following steps. First, a cutting step is performed, so as to cut a clothing fabric into a plurality of patterns. In this step, since the fabric is expected to shrink or expand in the subsequent steps, the cutting is effected with a size larger than that of a cutting pattern. Then, a bonding step is performed, so as to bond fusible interlinings to thus cut outer parts. In this step, the fabric shrinks since heat is applied thereto by a bonding machine. Accordingly, after an appropriate period of time from the completion of the bonding step, each part is cut again with the above-mentioned cutting pattern size.

Thereafter, a sewing step is effected, so as to sew each part. During this sewing step, since it is necessary to adjust sizes, surplus portions of fabric are cut off with scissors. While the sewn clothes are subjected to an inspecting step, there are many defective products which deform over time. These defective products are subjected to repair and reprocessing.

Thus, the conventional manufacture of clothes has shortcomings as follows. Namely, since shrinkage ratio varies among fabrics, it is necessary to cut a fabric with a size larger than its cutting pattern. Also, in the subsequent steps, it is required for the fabric to be recut twice. Further, even after these two recutting operations, the fabric cannot be completely adjusted with respect to shrinkage, thus increasing the number of defective products which deform over time.

SUMMARY OF THE INVENTION

It is an object of the present invention to provide a method of correcting a cutting pattern which, while simplifying manufacturing steps, can reduce the defect ratio in clothes made thereby; a cutting pattern correction system; and a storage medium for cutting pattern correction.

The first aspect of the present invention is a method of correcting, according to a characteristic of a fabric, a cutting pattern for cutting the fabric into a plurality of parts, the method comprising the steps of:

sponging the fabric;

measuring a shrinkage ratio of thus sponged fabric; and correcting the cutting pattern according to thus obtained shrinkage ratio data.

The second aspect of the present invention is a system for correcting, according to a characteristic of a fabric, a cutting pattern for cutting the fabric into a plurality of parts, the system comprising:

sponging means for sponging the fabric;

material measuring means for measuring a shrinkage ratio of the fabric after being sponged by the sponging means; and cutting pattern correction means for correcting the cutting pattern according to data measured by the material measuring means.

The third aspect of the present invention is a storage medium which stores a cutting pattern correction program for correcting, according to a characteristic of a fabric, a cutting pattern for cutting the fabric into a plurality of parts, and is adapted to execute the cutting pattern correction program by use of a predetermined information processing apparatus;

the cutting pattern correction program comprising:

a data input section for receiving inputs of data of the cutting pattern and shrinkage ratio data of the fabric measured after the fabric is sponged; and a pattern correction section for correcting the cutting pattern according to the data received at the data input section.

In accordance with the present invention, as the fabric is sponged, the amount of moisture contained in the fabric is controlled while the tension applied to the fabric is relaxed, whereby the fabric is restrained from changing its size in the subsequent steps. Then, as the shrinkage ratio of thus sponged fabric is measured, highly accurate shrinkage ratio data can be obtained.

Further, since a series of steps such as bonding, pressing and moisturizing are in the same flow as the actual steps for manufacturing clothes, the shrinkage ratio of the fabric in the state after a predetermined period of time from the moisturizing is substantially the same as that at the last stage in the actual steps for manufacturing clothes. Consequently, as the shrinkage ratio is measured by use of a fabric to which the same stress as that of the subsequent steps, such as bonding, pressing, moisturizing, and the elapse of a predetermined time thereafter, has been applied, more accurate shrinkage ratio data can be obtained.

Also, when unit weight data and/or tensile characteristic data are used in addition to shrinkage ratio data, the cutting pattern can be corrected with a high accuracy. In particular, correction can be effected while taking account of in which direction and with how much strength each part of the clothes is pulled in conformity to movement of a body.

For example, the parts of clothes are divided into a plurality of groups, such as a partially bonding parts group, a whole-surface bonding parts group, and a front facing parts group, which receive different heat quantities upon manufacture, and the cutting pattern is further corrected by use of a modification value determined beforehand for each group. Consequently, the clothes made by use of the corrected cutting pattern can yield a very low defect ratio.

As the shrinkage ratio of the sponged fabric is measured by the material measuring means, highly accurate shrinkage ratio data can be obtained. Further, as the cutting pattern is corrected by the cutting pattern correction means according to these data, the clothes made by use of the corrected cutting pattern can yield a very low defect ratio.

When the storage medium of the present invention is accommodated in an information processing apparatus for correcting the cutting pattern, and the cutting pattern correction program is read out from this storage medium, the cutting pattern correction program can be executed by the information processing apparatus. Namely, at first, a user inputs the shrinkage ratio data of the fabric measured after sponging, and these input data are received at the data input section of the cutting pattern correction program. Then, the pattern correction section corrects the cutting pattern according to the shrinkage data received at the data input section. Thus, as correction is made according to the shrinkage ratio data, the clothes made by use of the corrected cutting pattern can yield a very low defect ratio.

Also, when unit weight data and/or tensile characteristic data are used in addition to shrinkage ratio data, the cutting pattern can be corrected with a high accuracy. In particular, correction can be effected while taking account of in which direction and with how much strength each part of the clothes is pulled in conformity to movement of a body.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 4A, 4B, and 4C are Tables 1, 2, and 3, respectively referred to when calculating correction values;

DETAILED DESCRIPTION OF THE PREFERRED EMBODIMENTS

In the following, preferred embodiments of the cutting pattern correcting method, cutting pattern correction system, and storage medium for cutting pattern correction in accordance with the present invention will be explained with reference to the accompanying drawings.

Figure 1:
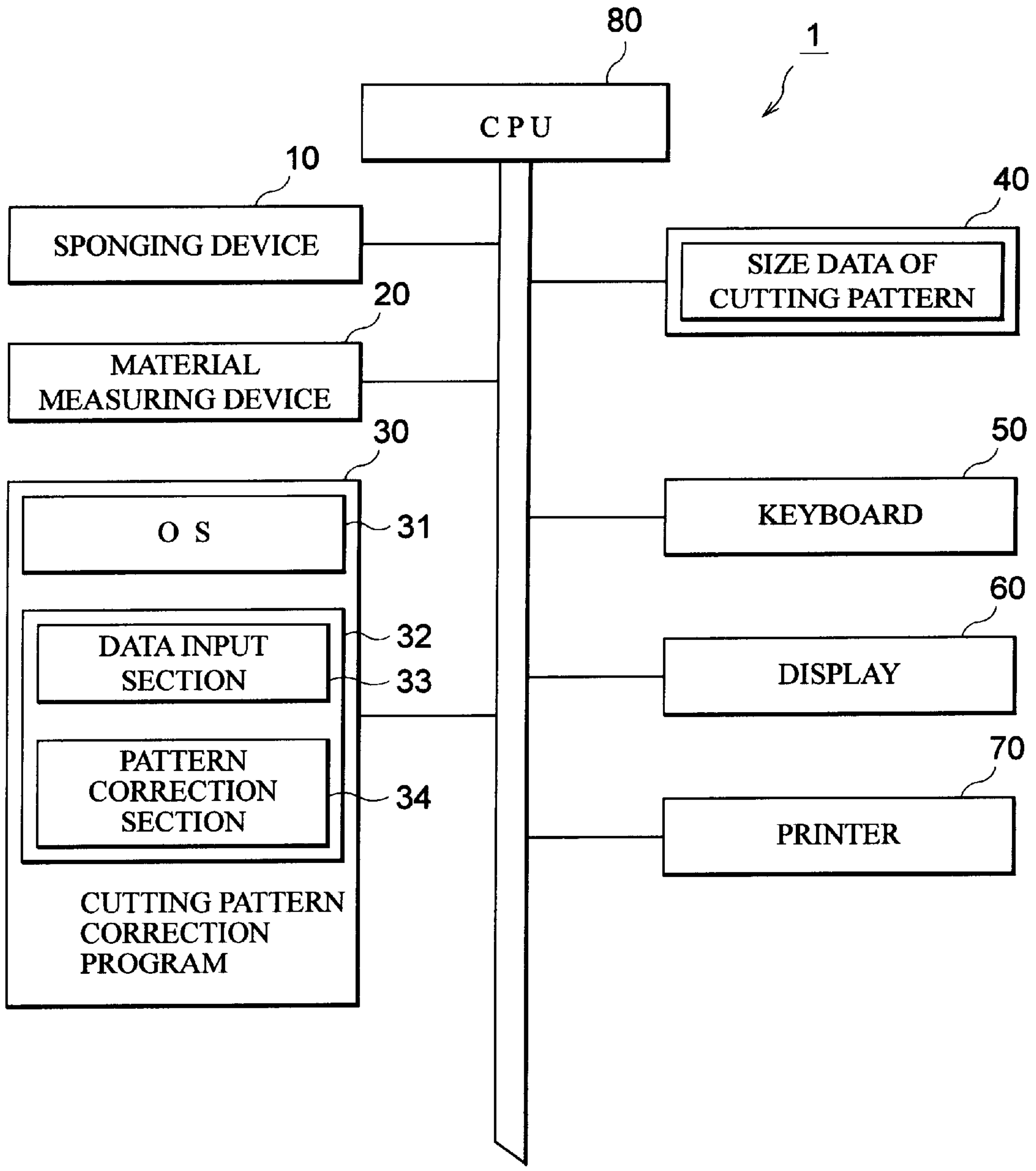
FIG. 1 is a block diagram showing a cutting pattern correction system in accordance with an embodiment of the present invention.

FIG. 1 is a block diagram showing a cutting pattern correction system 1 in accordance with an embodiment of the present invention. As depicted in FIG. 1, the cutting pattern correction system 1 comprises a sponging device (sponging means) 10 for relaxing a clothing fabric and controlling the amount of moisture therein, a material measuring device (material measuring means) 20 which measures the shrinkage ratio, unit weight, and tensile characteristic of the sponged fabric, and a memory device 30 storing therein an operating system (OS) 31 and a cutting pattern correction program (cutting pattern correction means) 32.

Also, the cutting pattern correction system 1 comprises a hard disk device 40 storing therein size data of a cutting pattern, a keyboard 50 for inputting data, a display device 60 for displaying the cutting pattern, a printer 70 for outputting the cutting pattern, and a CPU 80 for controlling execution of the cutting pattern correction program 32 and the like.

Here, employed as the sponging device 10 is Sponging Machine VA-6 (manufactured by Vitec Co., Ltd.). Used as the material measuring device 20 are press shrinkage testers VF-3A and Aging-CB (both manufactured by Vitec Co., Ltd.) and KES-FB system (Katotec Co., Ltd.). The tensile characteristic data measured by the material measuring device 20 are data of tensile characteristic KES (Kawabata Evaluation System) according to KES-FB system. Here, KES refers to a method in which fabric hand is evaluated by respective physical values of shear, tensility, and bending. The tensile characteristic data obtained by this evaluating method are quite highly reliable. KES-FB system is disclosed, for example, in Fuai Hyoka No Hyojunka To Kaiseki (Standardization and Analysis of Fabric Hand Evaluation), Toshio Kawabata, the Textile Machinery Society of Japan.

The cutting pattern correction program 32 comprises a data input section 33 for receiving inputs of shrinkage ratio data, and a pattern correction section 34 for correcting the cutting pattern according to the shrinkage ratio data. Here, the data input section 33 may either directly receive inputs of unit weight data and the like sent from the material measuring device 20 to the cutting pattern correction program 32 or receive unit weight data and the like inputted by the user through the keyboard 50 according to data printed out after being sent to the printer 70 from the material measuring device 20. Also, when modification values for each group, which will be explained later, are determined, these modification values are fed into the data input section 33, and the cutting pattern is more precisely corrected at the pattern correction section 34 according to the shrinkage ratio data and modification values.

Figure 2:
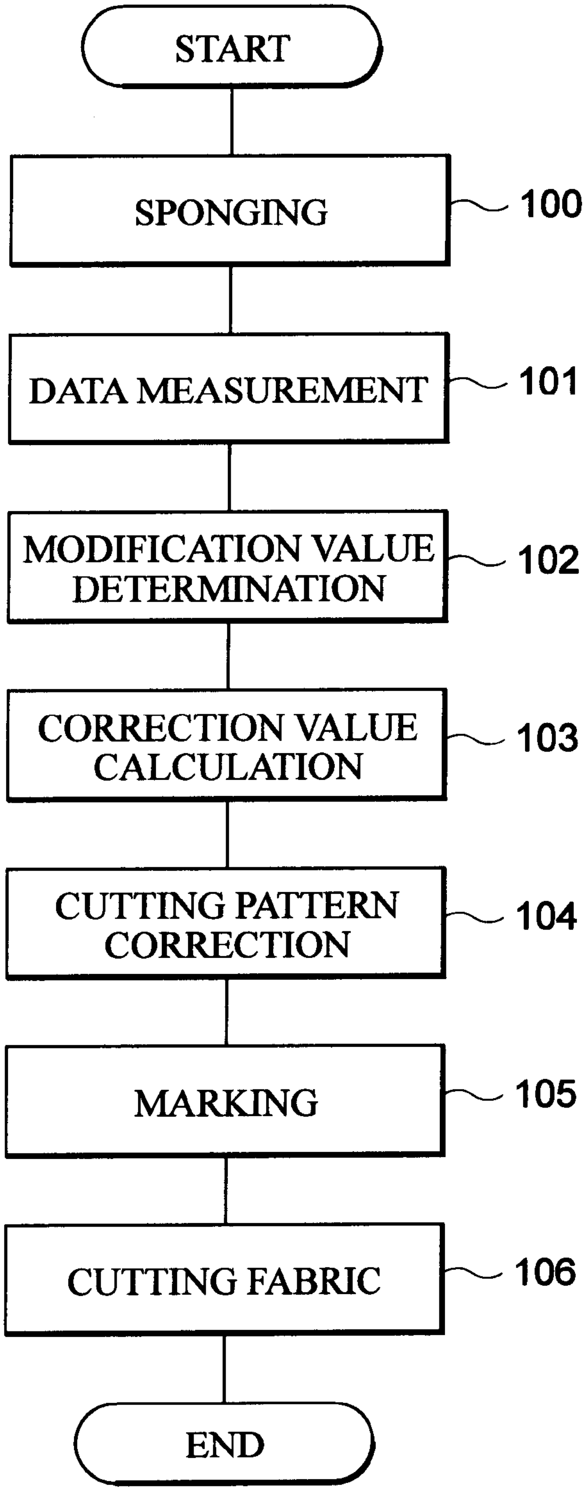
FIG. 2 is a flowchart showing a process of making clothes by use of the cutting pattern correction system in accordance with the above-mentioned embodiment of the present invention.

In the following, a process of making clothes by use of the cutting pattern correction system 1 will be explained. As shown in the flowchart of FIG. 2, at first, a fabric is introduced into the sponging device 10 so as to be subjected to sponging (step 100). Upon this processing, the amount of moisture contained in the fabric is controlled to a predetermined level, so the stress of tension applied to the fabric can be nullified, whereby the fabric is restrained from changing its size in the subsequent steps. Then, a part of thus sponged fabric is introduced into the material measuring device 20 as a sample, and data of the fabric are measured (step 101). Items of data measurement include shrinkage ratio data, unit weight data, and tensile characteristic KES data.

In the measurement of shrinkage ratio data, the sewing process of clothes is simulated, and how much the fabric shrinks after the completion of this process is measured. Namely, in the sewing process, bonding, pressing, and moisturizing operations are successively performed at intervals of time, thereby applying stress to the fabric. Here, in the parts where no interlining is to be attached, no operation is effected for bonding an interlining to the fabric (outer fabric). Accordingly, when the same stress is applied to a sample fabric beforehand, the shrinkage ratio of the fabric can be measured with high accuracy.

Specifically, for parts (such as front body and facing) where interlinings are to be attached, a sample fabric is subjected to bonding, pressing, and moisturizing operations in succession, and the longitudinal and lateral sizes of the fabric are measured after the elapse of a predetermined time from the moisturizing, whereby the longitudinal and lateral shrinkage ratios of the fabric are determined. On the other hand, for parts (such as back body and outside sleeve) where no interlinings are to be attached, the sample fabric is subjected to pressing and moisturizing operations in succession, and the longitudinal and lateral sizes of the fabric are measured after the elapse of a predetermined time from the moisturizing, whereby the longitudinal and lateral shrinkage ratios of the fabric are determined.

Since stress is hardly applied to the fabric in the steps subsequent to the measurement, the shrinkage ratio obtained by the measurement is substantially equal to the final shrinkage ratio of the product formed. Accordingly, when the shrinkage ratio data obtained at the measurement of modification values are used in the final correction processing, the cutting pattern can be corrected with high accuracy.

In the measurement of unit weight data, the weight of the sample fabric per square meter is actually measured. In the measurement of tensile characteristic KES data, stress of the sample fabric is measured while being actually pulled in the longitudinal and lateral directions of the fabric. Though a sufficiently accurate pattern can be obtained even when the cutting pattern is simply corrected according to the above-mentioned shrinkage ratio data, a more accurate pattern can be made when the cutting pattern is corrected while taking account of the unit weight data and tensile characteristic KES data in addition to the shrinkage ratio data.

Next, according to the shrinkage ratio data, unit weight data, and tensile characteristic KES data obtained at step 101, size data of a master pattern are corrected, and correction values are calculated (step 103). This processing is performed by executing the cutting pattern correction program 32 under the control of the CPU 80. First, the data input section 33 is executed so as to receive inputs of the shrinkage ratio data and the like. Then, the pattern correction section 34 is executed, whereby the correction values are calculated according to each kind of data received at the data input section 33.

Figure 3:
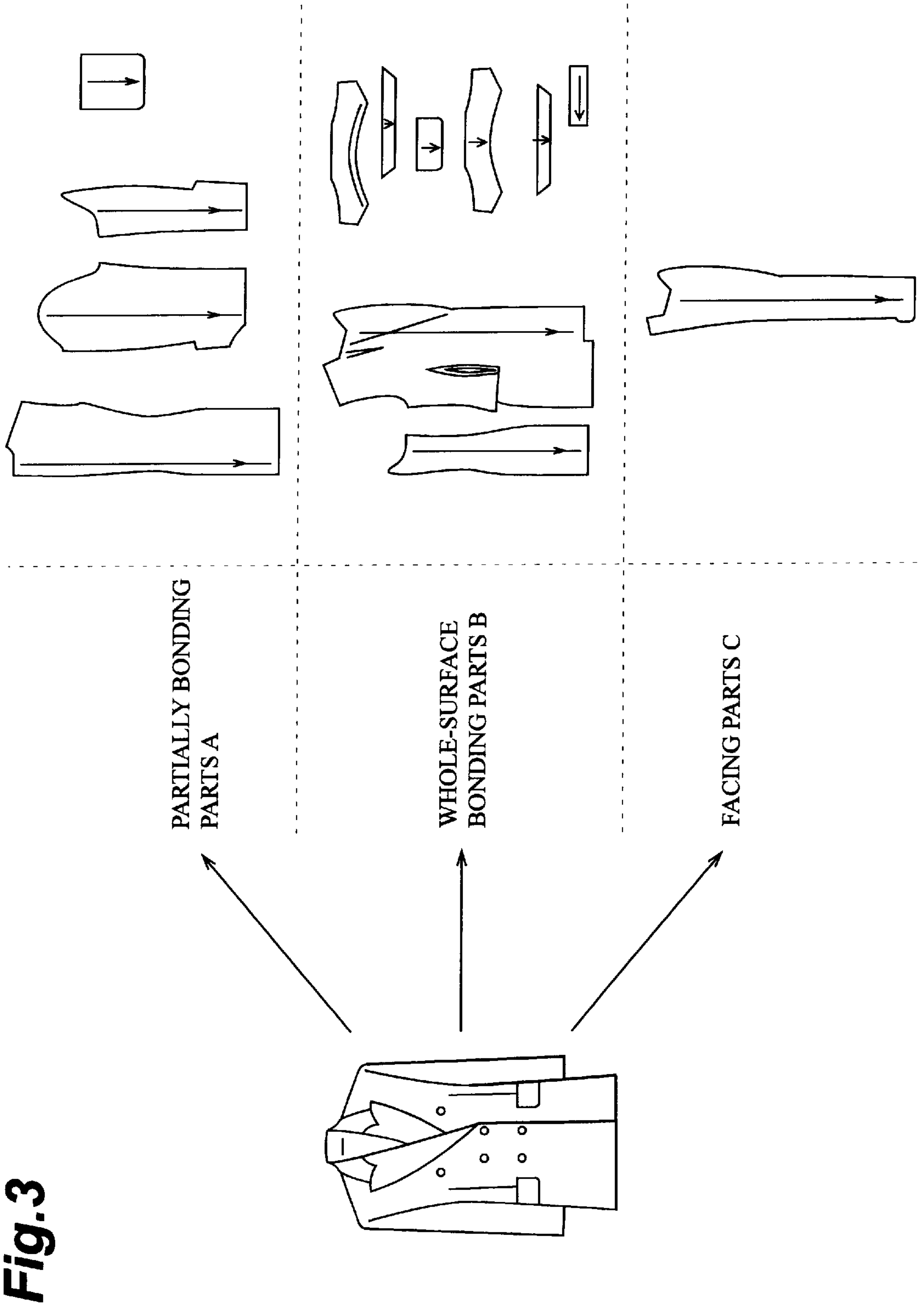
FIG. 3 is a view showing an example in which parts constituting clothes are divided into a plurality of groups.

When the parts constituting clothes are divided into three groups as shown in FIG. 3, the correction values can be computed by expressions for the individual groups. The groups are constituted by partially bonded parts group A, whole-surface bonded parts group B, and facing parts group C, which are distinguished from each other according to differences in processing at the subsequent sewing step. Such grouping is just an example thereof, and the parts may be grouped in other manners as well. The sample fabric may be subjected to processing steps corresponding to such groups beforehand, so as to determine modification values (step 102); and then the measured data may be more accurately corrected according to these modification values (step 103).

The expressions for yielding the final correction values for each group, which are determined in view of the measured data and modification values, are as follows:

For partially bonded parts group A:

[longitudinal] Y %=(shrinkage ratio data)−(modification value corresponding to unit weight data in Table 1)−(modification value corresponding to tensile characteristic KES data in Table 2)+100

[lateral] X %=(shrinkage ratio data)−(modification value corresponding to unit weight data in Table 1)−(modification value corresponding to tensile characteristic KES data in Table 2)+100

For whole-surface bonded parts group B:

[longitudinal] Y %=(shrinkage ratio data)−(modification value corresponding to unit weight data in Table 1)+100

[lateral] X %=(shrinkage ratio data)−(modification value corresponding to unit weight data in Table 1)+100

For facing parts group C:

[longitudinal] Y %=(shrinkage ratio data)−(modification value corresponding to unit weight data in Table 3)+100

[lateral] X %=(shrinkage ratio data)−(modification value corresponding to unit weight data in Table 1)+100

Tables 1, 2, and 3 used in these expressions are shown in FIGS. 4A, 4B, and 4C, respectively. Here, it is noted that the longitudinal correction value for facing parts group C is determined by using the modification value corresponding to the unit weight data listed not in Table 1 but in Table 3. This is because it is necessary to take into account an allowance in designing a facing pattern. For example, in the case where the longitudinal shrinkage data, lateral shrinkage ratio data, unit weight data, and tensile characteristic KES data are respectively 17.76%, 17.80%, 230.5 g/m$^2$, and 8.3, the modification value corresponding to the unit weight data in Table 1 is 0.4. Also, the modification value corresponding to the tensile characteristic KES data in Table 2 is 0.8. Further, the modification value corresponding to the unit weight data in Table 3 is 0.2.

Therefore, the final correction values for partially bonded parts group A are:

[longitudinal] 17.76−0.4−0.8+100=116.56%

[lateral] 17.80−0.4−0.8+100=116.60%

Accordingly, for partially bonded parts group A, the cutting pattern is corrected such that its size is enlarged by 116.56% in the longitudinal direction and 116.60% in the lateral direction.

The final correction values for whole-surface bonded parts group B are:

[longitudinal] 17.76−0.4+100=117.36%

[lateral] 17.80−0.4+100=117.40%

Accordingly, for whole-surface bonded parts group B, the cutting pattern is corrected such that its size is enlarged by 117.36% in the longitudinal direction and 117.40% in the lateral direction.

The final correction values for facing parts group C are:

[longitudinal] 17.76−0.2+100=117.56%

[lateral] 17.80−0.4+100=117.40%

Accordingly, for facing parts group C, the cutting pattern is corrected such that its size is enlarged by 117.56% in the longitudinal direction and 117.40% in the lateral direction.

According to the correction values for the respective parts obtained by the foregoing calculations, the cutting pattern is actually corrected (step 104). This correction is effected by use of a CAD (computer aided design) system (not depicted). Data may be directly transferred to the CAD system from the cutting pattern correction system 1 through a circuit. Also, data outputted to the display 60 or printer 70 of the cutting pattern correction system 1 may be inputted by the user through a keyboard of the CAD system. According to a complete cutting pattern obtained after correction, the CAD system prepares a marking (step 105). Data of thus prepared marking are fed to a CAM (computer aided manufacturing) system (not depicted), and the CAM system cuts the fabric with the corrected cutting pattern (step 106). When each of thus cut parts is subjected to the sewing process, no recutting is necessary therein, whereby the number of steps necessary for sewing can be reduced. Also, the clothes completed after such a manufacturing process hardly deform over time, thus yielding quite excellent effects in terms of making clothes.

Figure 5:
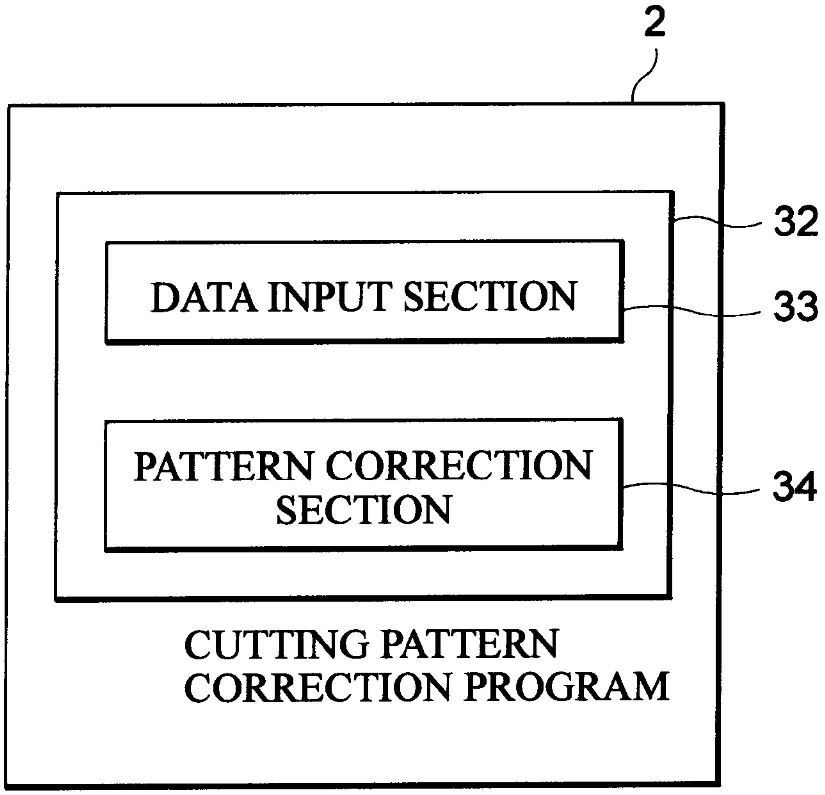
FIG. 5 is a block diagram showing a data configuration of a storage medium for cutting pattern correction.

In the following, a storage medium for cutting pattern correction, which is an embodiment of the present invention, will be explained. As shown in FIG. 5, a cutting pattern correction storage medium 2 stores therein a cutting pattern correction program 32 for correcting, according to a characteristic of a clothing fabric, a cutting pattern for cutting the fabric into a plurality of parts. The cutting pattern correction program 32 comprises a data input section 33 for receiving inputs of shrinkage ratio data and a pattern correction section 34 for correcting the cutting pattern according to the shrinkage ratio data. the cutting pattern correction storage medium 2 may be any storage medium, such as floppy disk, CD-ROM, MD, DVD, and IC card, which can optically or magnetically record information. In the case where modification values for each group are determined, these modification values are fed into the data input section 33, and the cutting pattern is more accurately corrected at the pattern correction section 34 according to the shrinkage ratio data and modification values.

Figure 6:
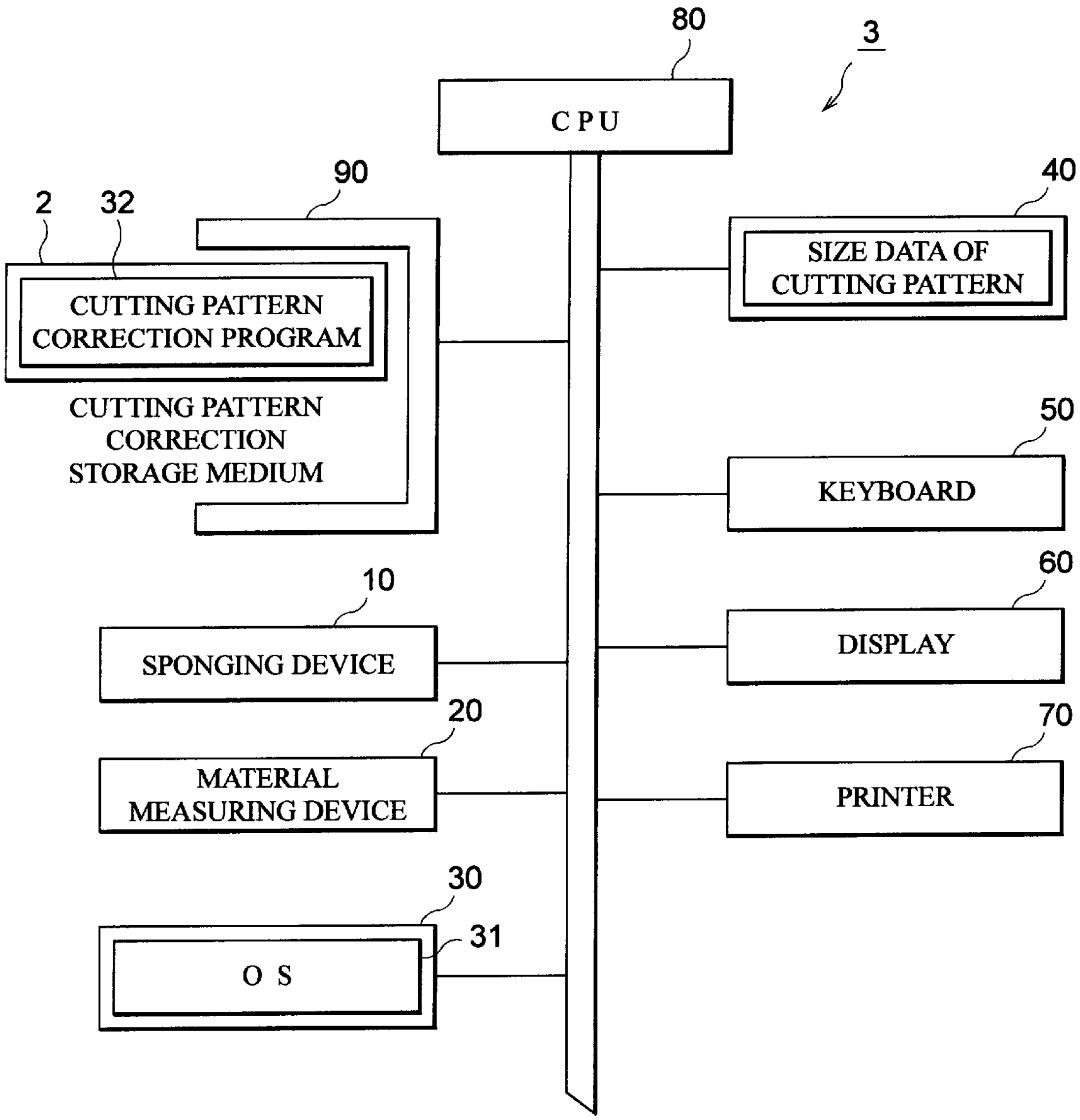
FIG. 6 is a block diagram showing a configuration of an information processing apparatus for cutting pattern correction.

The cutting pattern correction program 32 stored in the cutting pattern correction storage medium 2 can be executed by an information processing apparatus. FIG. 6 shows an example of such information processing apparatus. As shown in FIG. 6, an information processing apparatus 3 comprises a storage medium readout device 90 for reading out the cutting pattern correction program 32 stored in the cutting pattern correction storage medium 2, a sponging device 10 for relaxing a clothing fabric, and a material measuring device 20 for measuring the unit weight and the like of the sponged fabric. Also, the information processing apparatus 3 comprises a memory device 30 storing therein an operation system 31, a hard disk device 40 storing therein size data of a cutting pattern, and a keyboard 50 for inputting data. Further, the information processing apparatus 3 comprises a display device 60 for displaying the cutting pattern, a printer 70 for outputting the cutting pattern, and a CPU 80 for controlling execution of the cutting pattern correction program 32 and the like.

When the cutting pattern correction storage medium 2 is inserted into the storage medium readout device 90, the cutting pattern correction program 32 stored in the cutting pattern correction storage medium 2 is read out by the storage medium readout device 90 so as to be stored into the memory device 30.

Consequently, the configuration of the information processing apparatus 3 is substantially the same as that of the cutting pattern correction system 1 shown in FIG. 1. As a result, the processing in the case where the cutting pattern correction program 32 is executed by the information processing apparatus 3 becomes substantially the same as that of the above-mentioned cutting pattern correction system 1. Accordingly, the contents of processing in the cutting pattern correction program 32 will not be explained here.

Without being restricted to the foregoing embodiments, the present invention can be modified, within the scope not deviating from the gist of the invention, for example, as follows:

(1) Though the shrinkage ratio, unit weight, and tensile characteristic of a fabric are measured by the material measuring device 20, and correction values are calculated according to these characteristic data in the above-mentioned embodiments; bending and shear characteristics of the fabric may further be measured, and one or both kinds of these characteristic data may be added to the previously mentioned characteristic data, so as to calculate correction values.

(2) Though Table 2 for determining correction values from tensile characteristic KES data is the one employing only the tensile characteristic KES data as a parameter, unit weight data may also be used as a parameter. Further, with tensile characteristic KES data and unit weight data employed as parameters, random numbers may be used for determining correction values.

In the cutting pattern correcting method and cutting pattern correction system in accordance with the present invention, since a fabric is sponged, the amount of moisture contained in the fabric is controlled, and the tension applied to the fabric is relaxed, whereby the fabric is restrained from changing its size in the subsequent steps. Also, since the shrinkage ratio of the sponged fabric is measured, and a cutting pattern is corrected according to thus measured shrinkage ratio data, the clothes made by use of the corrected cutting pattern yield a very low defect ratio.

Further, since the cutting pattern correction storage medium in accordance with the present invention corrects a cutting pattern according to shrinkage ratio data, the clothes made by use of the corrected cutting pattern yield a very low defect ratio.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of correcting, according to a characteristic of a clothing fabric, a cutting pattern for cutting the clothing fabric into a plurality of parts of clothes, said method comprising:

sponging a fabric sample of a fabric to be made into parts of clothes;

simulating a sewing process used in making the parts of clothes from the fabric on the fabric sample that has been sponged:

measuring a shrinkage ratio of the fabric sample after simulating the sewing process; and correcting a cutting pattern for cutting the fabric into the parts of clothes based on the shrinkage ratio of the fabric sample.

2. The method according to claim 1, including, in simulating the sewing process, bonding an interlining to the fabric sample, and successively pressing and moisturizing the fabric sample, and, after a predetermined period of time from moisturizing, measuring the shrinkage ratio.

3. The method according to claim 1, including, in simulating the sewing process, pressing and moisturizing the fabric sample, and after a predetermined period of time from moisturizing, measuring the shrinkage ratio.

4. The method according to claim 1, including measuring a unit weight and/or a tensile characteristic together with the shrinkage ratio of the fabric sample, and correlation the cutting pattern according to the shrinkage ratio unit weight, and/or tensile characteristic.

5. The method according to claim 1, including dividing the parts of clothes into a plurality of groups according to a difference in processing in clothes sewing, after cutting, and further correcting the cutting pattern using a modification value determined beforehand for each group.

6. A system for correcting, according to a characteristic or a clothing fabric, a cutting pattern for cutting the clothing fabric into a plurality of parts of clothes, said system comprising:

sponging means for sponging a fabric sample of a fabric to be made into parts of clothes;

simulating means for simulating a sewing process, used in making the parts of clothes from the fabric, on the fabric sample that has been sponged;

material measuring means for measuring a shrinkage ratio of the fabric sample after simulating the sewing process; and cutting pattern correction means for correcting a cutting pattern for cutting the fabric into the parts of clothes according to the shrinkage ratio of the fabric sample measured by said material measuring means.

7. The system according to claim 6, wherein, in simulating the sewing process. bonding an interlining to the fabric sample, and successively pressing and moisturizing the fabric sample, and, after a predetermined period of time from moisturizing, the shrinkage ratio of the fabric sample is measured by said material measuring means.

8. The system according to claim 6, wherein said sample fabric is successively subjected to, in simulating the sewing process, pressing and moisturizing the fabric sample, and, after a predetermined period of time from moisturizing, the shrinkage of the fabric sample is measured by said material measuring means.

9. The system according to claim 6, wherein a unit weight and/or a tensile characteristic of the fabric sample is measured together with the shrinkage ratio of the fabric sample by said material measuring means.

10. The system according to claim 6, wherein the parts of clothes are divided into a plurality of groups according to a difference in a clothes sewing process effected after cutting, and the cutting pattern is further corrected by said cutting pattern correction means using a modification value determined beforehand for each group.

11. A storage medium which stores a cutting pattern correction program for correcting, according to a characteristic of a clothing fabric, a cutting pattern for cutting the clothing fabric into a plurality of parts of clothes, and for executing the cutting pattern correction program in an information processing apparatus, the cutting pattern correction program comprising:

a data input section for receiving inputs of data of the cutting pattern and shrinkage ratio data of a fabric sample of a fabric to be made into clothes, after the fabric sample has been sponged and a sewing process simulated on the fabric sample; and a pattern correction section for correcting the cutting pattern according to the data received by said data input section.

12. The storage medium according to claim 11, wherein unit weight data and/or tensile characteristic data of the fabric sample is input to said data input section together with the shrinkage ratio data.

13. The storage medium according to claim 11, wherein the parts of clothes are divided into a plurality of groups according to a difference in clothes sewing after cutting, and the cutting pattern is further corrected at said pattern correction section using a modification value determined beforehand for each group.

* * * * *